US008442142B2

(12) United States Patent
Ojard et al.

(10) Patent No.: US 8,442,142 B2
(45) Date of Patent: May 14, 2013

(54) METHOD AND SYSTEM FOR BEAMFORMING SIGNAL TRANSMISSION UNDER A PER-ANTENNA POWER CONSTRAINT

(75) Inventors: Eric Ojard, San Francisco, CA (US); Sirikiat Ariyavisitakul, Alpharetta, GA (US); Joonsuk Kim, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 405 days.

(21) Appl. No.: 12/761,567

(22) Filed: Apr. 16, 2010

(65) Prior Publication Data

US 2011/0205118 A1 Aug. 25, 2011

Related U.S. Application Data

(60) Provisional application No. 61/306,427, filed on Feb. 19, 2010.

(51) Int. Cl.
*H01Q 3/00* (2006.01)
*G01S 1/00* (2006.01)

(52) U.S. Cl.
USPC .......................................... 375/267; 375/297

(58) Field of Classification Search .................. 375/267, 375/297, 299, 295; 455/91, 101, 127.2, 127.1, 455/522
See application file for complete search history.

(56) References Cited

U.S. PATENT DOCUMENTS

| | | | | |
|---|---|---|---|---|
| 2004/0023621 | A1 * | 2/2004 | Sugar et al. | 455/103 |
| 2004/0178954 | A1 * | 9/2004 | Vook et al. | 342/383 |
| 2006/0258403 | A1 * | 11/2006 | Vaidyanathan | 455/562.1 |
| 2007/0077968 | A1 * | 4/2007 | Kuzminskiy | 455/562.1 |
| 2008/0051045 | A1 * | 2/2008 | Hwang et al. | 455/127.2 |
| 2009/0280760 | A1 * | 11/2009 | Ohwatari et al. | 455/127.2 |
| 2011/0002414 | A1 * | 1/2011 | Coldrey et al. | 375/296 |
| 2011/0210892 | A1 * | 9/2011 | Shany et al. | 342/373 |

OTHER PUBLICATIONS

Yuanye Wang, Muhammad Imadur Rahman, Suvra Sekhar Das, Troels Sørensen and Preben Mogensen, "Allocation Fairness for MIMO Precoded UTRA-LTE TDD System", Radio Access Technology Section, Ericsson Research and Embedded Systems Group, IEEE, Sep. 2008.*

Magnus Sandell and Justin P. Coon, Per-Subcarrier Antenna Selection with Power Constraints in OFDM Systems, Toshiba Research Europe Ltd, Feb. 2009, IEEE.*

Wei Yu and Tian Lan "Transmitter Optimization for the Multi-Antenna Downlink With Per-Antenna Power Constraints", University of Toronto, Jun. 2007, IEEE.*

Runhua Chen, Jeffrey G. Andrews, and Robert W. Heath, Jr., "Efficient Transmit Antenna Selection for Multiuser MIMO Systems with Block Diagonalization", The University of Texas at Austin, Nov. 2007, IEEE.*

* cited by examiner

*Primary Examiner* — Aristocratis Fotakis

(74) *Attorney, Agent, or Firm* — Garlick & Markison; Bruce E. Garlick

(57) ABSTRACT

A method and system for beamforming signal transmission under a per-antenna power constraint is presented. In one aspect, a multiple input multiple output (MIMO) transmitting station may compute a per-antenna power gain factor for each of a plurality of transmit chain signals. The transmit chain signals may be concurrently transmitted by a plurality of transmitting antennas at the MIMO transmitting station. The plurality of transmit chain signals may correspond to beamforming signals, which are generated by performing spatial mapping on a plurality of space-time signals. The plurality of power gain factors may be computed based on a per-antenna power constraint. Alternatively, the plurality of power gain factors may be computed based on joint per-antenna power and total-power constraints. Each of the transmit chain signals may be amplified or attenuated based on the corresponding antenna gain factor. The amplified or attenuated signal is then transmitted by the corresponding transmitting antenna.

36 Claims, 6 Drawing Sheets

METHOD AND SYSTEM FOR BEAMFORMING SIGNAL TRANSMISSION UNDER A PER-ANTENNA POWER CONSTRAINT

CROSS-REFERENCE TO RELATED APPLICATIONS/INCORPORATION BY REFERENCE

This application makes reference to, claims priority to, and claims the benefit of U.S. Provisional Application Ser. No. 61/306,427 filed Feb. 19, 2010, which is hereby incorporated herein by reference in its entirety.

This application makes reference to U.S. application Ser. No. 12/246,206 filed Oct. 6, 2008, which is hereby incorporated herein by reference in its entirety.

FIELD OF THE INVENTION

Certain embodiments of the invention relate to communication networks. More specifically, certain embodiments of the invention relate to a method and system for beamforming signal transmission under a per-antenna power constraint.

BACKGROUND OF THE INVENTION

Multiple input multiple output (MIMO) systems enable high speed wireless communications by concurrently transmitting a plurality of $N_{STS}$ data streams using a plurality of $N_{TX}$ transmitting antennas at a transmitting station. The concurrently transmitted data streams may be received at a receiving station using a plurality of $N_{RX}$ receiving antennas. The IEEE 802.11n specification contains specifications for the use of MIMO systems in wireless local area networks (LAN).

In wireless LANs utilizing multiple transmit antennas, the radiating power for signals transmitted by a transmitting station may be limited by a total-power constraint or a per-antenna power constraint, or a combination of the two. A total-power constraint may set an upper limit on the total radiating power across all transmitting antennas at a transmitting station, while a per-antenna power constraint may set an upper limit on the radiating power emitted from any single antenna at the transmitting station.

A total-power constraint usually results from regulations governing a given geographical region and/or frequency band. The total-power constraint may be represented by a maximum total-power level parameter, $P_{total}$. A per-antenna power constraint usually results from limitations in the radio transmitter circuitry at the transmitting station (for example, a power amplifier may create unacceptable levels of distortion when the radiated power level from a given antenna exceeds the per-antenna power constraint. The per-antenna power constraint may be represented by a maximum per-antenna power level parameter, $P_{max}$. Depending on the capabilities of the transmitting station and/or applicable regulations, one or both of these constraints may apply for communication between wireless devices, for example communicating stations in a wireless LAN. Some popular wireless LAN standards are designed to operate under a total power constraint and may perform poorly when operating under a per-antenna power constraint.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for beamforming signal transmission under a per-antenna power constraint, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
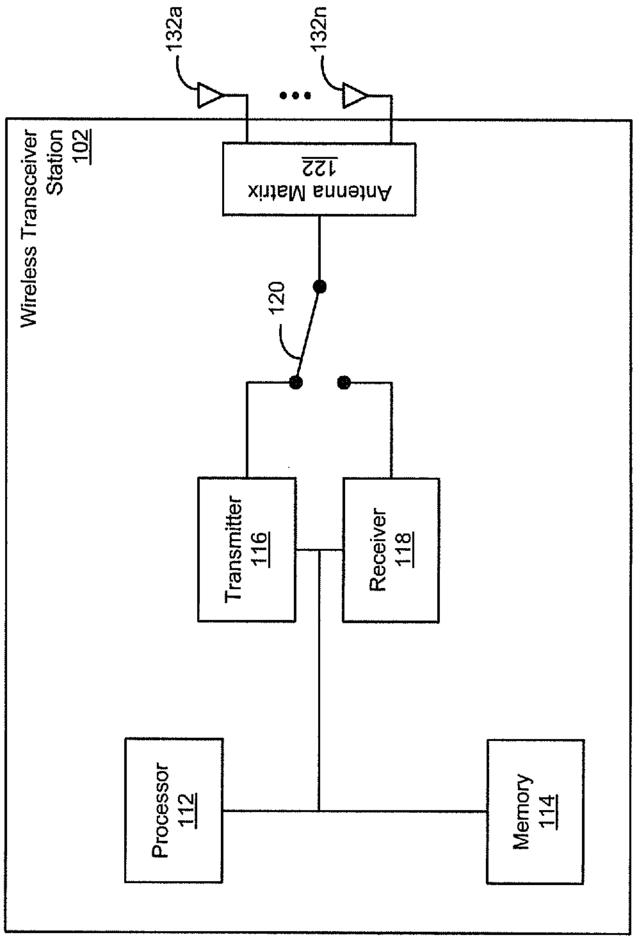
FIG. 1 is a block diagram of an exemplary MIMO transceiver, which may be utilized in connection with an embodiment of the invention.

Certain embodiments of the invention may be found in a method and system for beamforming signal transmission under a per-antenna power constraint. Various embodiments of the invention comprise a method and system for computing a per-antenna power gain factor for each of a plurality of transmit chain signals that are concurrently transmitted by a corresponding plurality of transmitting antennas at a MIMO transmitting station. The plurality of transmit chain signals may correspond to beamforming signals, which are generated by performing spatial mapping on a plurality of space-time signals. The plurality of power gain factors may be computed based on a per-antenna power constraint. Alternatively, the plurality of power gain factors may be computed based on joint per-antenna power and total-power constraints. Each of the transmit chain signals may be amplified or attenuated based on the corresponding antenna gain factor. The amplified or attenuated signal is then transmitted by the corresponding transmitting antenna.

In various embodiments of the invention, a transmit chain power level is computed for each of the transmit chain signals, $T_{i_{TX}}$ (where $i_{TX}$ is a transmit chain signal index). In various embodiments of the invention in which a per-antenna power constraint is applicable, a per-antenna power gain factor, $\alpha_{i_{TX}}$, may be computed for each transmit gain signal based on the corresponding transmit chain signal power level, $T_{i_{TX}}$, and the per-antenna power constraint, $P_{max.}$, where the value $P_{max}$ represents a maximum per-antenna threshold power level.

In various embodiments of the invention in which joint per-antenna and total-power constraints are applicable, an antenna gain constant, k, may be computed based on the per-antenna power constraint, $P_{max}$, the total-power constraint, $P_{total}$ and the aggregate transmit chain signal power for at least a portion of the plurality of transmit chain signals. The antenna gain factor, $\alpha_{i_{TX}}$, for each transmit chain signal is equal to the antenna gain constant, k, when the amplified transit chain signal power level (the transmit chain signal power, $T_{i_{TX}}$, after amplification by the antenna gain constant k) does not exceed the per-antenna power constraint $P_{max}$. When this condition is not met, the antenna gain factor for the transmit chain signal is computed based on the per-antenna power constraint.

In various embodiments of the invention, the maximum per-antenna threshold power level may be determined independently for each transmit chain, where $P_{max}^{i_{TX}}$ represents the maximum per-antenna threshold power level for the $i_{TX}^{th}$ transmit chain.

Various embodiments of the invention may be practiced in a variety of communication systems in which a transmitting station concurrently transmits a plurality of transmit chain signals. Exemplary embodiments of the invention may be practiced in single user MIMO (SU-MIMO) systems and multiple user MIMO (MU-MIMO) systems.

FIG. 1 is a block diagram of an exemplary MIMO transceiver, which may be utilized in connection with an embodiment of the invention. Referring to FIG. 1, there is shown a wireless transceiver station 102 and a plurality of antennas 132*a* . . . 132*n*. The wireless transceiver station 102 is an exemplary wireless communication device, which may be utilized at an access point (AP) device and/or at a station (STA) device (e.g., a client station or mobile user device) in a wireless communication system. The plurality of antennas 132*a* . . . 132*n* may enable the wireless transceiver station 102 to concurrently transmit and/or receive signals, for example radio frequency (RF) signals, via a wireless communication medium. The wireless transceiver station 102 shown in FIG. 1 may also be depicted as comprising one or more transmitting antennas, which are coupled to the transmitter 116 and one or more receiving antennas, which may be coupled to the receiver 118 without loss of generality.

The exemplary wireless transceiver station 102 comprises a processor 112, a memory 114, a transmitter 116, a receiver 118, a transmit and receive (T/R) switch 120 and an antenna matrix 122. The antenna matrix 122 may enable selection of one or more of the antennas 132*a* . . . 132*n* for transmitting and/or receiving signals at the wireless transceiver station 102. The T/R switch 120 may enable the antenna matrix 122 to be communicatively coupled to the transmitter 116 or receiver 118. When the T/R switch 120 enables communicative coupling between the transmitter 116 and the antenna matrix 122, the selected antennas 132*a* . . . 132*n* may be utilized for transmitting signals. When the T/R switch 120 enables communicative coupling between the receiver 118 and the antenna matrix 122, the selected antennas 132*a* . . . 132*n* may be utilized for receiving signals.

The transmitter 116 may enable the generation of signals, which may be transmitted via the selected antennas 132*a* . . . 132*n*. The transmitter 116 may generate signals by performing coding functions, signal modulation and/or signal modulation. In various embodiments of the invention, the transmitter 116 may enable generation of signals using precoding and/or beamforming techniques. The transmitter may also utilize one or more antenna gain factors that enable the transmission of beamforming signals under a per-antenna power constraint and/or a total-power constraint on the radiated signal power transmitted from transmitting antennas 132*a*, . . . , 132*n*.

The receiver 118 may enable the processing of signals received via the selected antennas 132*a* . . . 132*n*. The receiver 118 may generate data based on the received signals by performing signal amplification, signal demodulation and/or decoding functions. In various embodiments of the invention, the receiver 118 may enable generation of data, which may be utilized by the transmitter 116 for precoding and/or beamforming of generated signals.

The processor 112 may enable the generation of transmitted data and/or the processing of received data. The processor 112 may generate data, which is utilized by the transmitter 116 to generate signals. The processor 112 may process data generated by the receiver 118. In various embodiments of the invention, in a node B, the processor 112 may process data received by the receiver 118 and compute antenna gain factors, which may be utilized by the transmitter 116 for precoding and/or beamforming of generated signals. The coefficient data may be stored in the memory 114.

Figure 2:
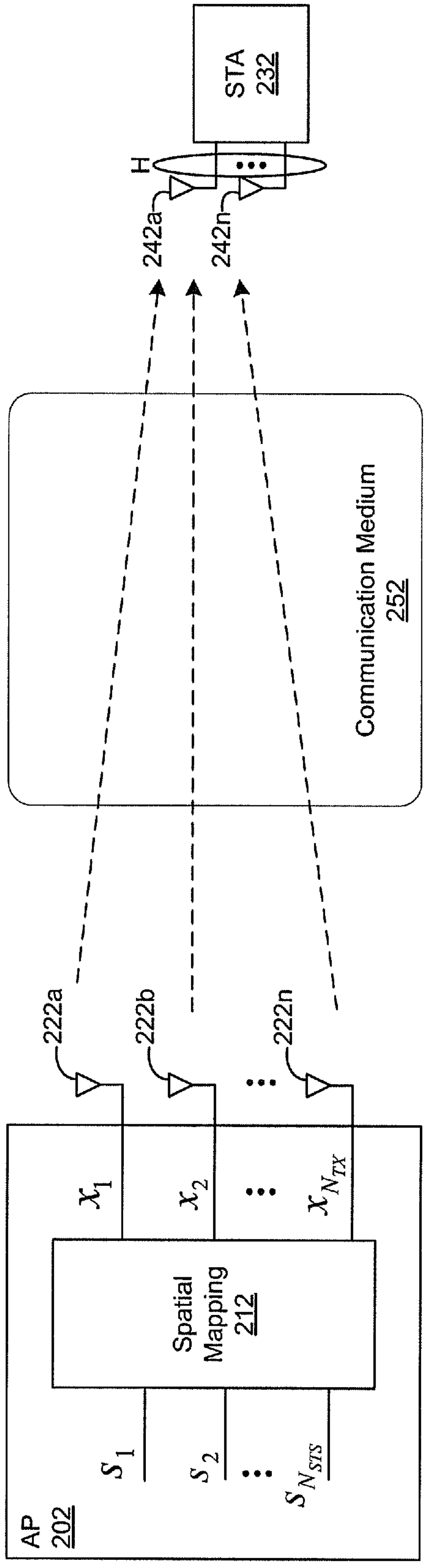
FIG. 2 is a block diagram of an exemplary MIMO system, which may be utilized in connection with an embodiment of the invention.

FIG. 2 is a block diagram of an exemplary MIMO system, which may be utilized in connection with an embodiment of the invention. Referring to FIG. 2, there is shown an AP 202 with a plurality of transmitting antennas 222*a*, 222*b*, . . . , 222*n*, a STA 232 with a plurality of antennas 242*a* . . . 242*n*, and a communication medium 252. The AP 202 may comprise a spatial mapping block 212. The number of transmitting antennas 222*a*, 222*b*, . . . , 222*n* may be represented by the quantity $N_{TX}$. The antennas 242*a* . . . 242*n* may be utilized for transmission and/or reception of signals at the STA 232. The AP 202 and/or the STA 232 and/or spatial mapping block 212 may comprise logic, circuitry and/or code that are operable to perform one or more of the functions described herein.

As illustrated in FIG. 2, an exemplary spatial mapping block 212 may receive a plurality of space-time streams, $s_1$, $s_2$, . . . , $s_{N_{STS}}$ (where $N_{STS}$ represents the number of space-time streams). Each of the space-time streams may comprise a plurality of $N_{ST}$ carrier frequency tones (also referred to as subcarrier tones) that are within the channel bandwidth for a selected RF channel band. Spatial mapping block 212 may receive a plurality of $N_{STS}$ space-time streams for the $k^{th}$ subcarrier tone, $[s_k]_1$, $[s_k]_2$, . . . , $[s_k]_{N_{STS}}$, and utilize a beamforming matrix, $Q_k$, to generate a plurality of $N_{TX}$ transmit chain signals for the $k^{th}$ subcarrier tone, $[x_k]_1$, $[x_k]_2$, . . . , $[x_k]_{N_{TX}}$. The transmit chain signals may be referred to as beamforming signals. The beamforming signals generated by the AP 202 may be transmitted via antennas 222*a*, 222*b*, . . . , 222*n*. The transmitted signals may propagate through the communication medium 252 and subsequently be received at the STA 232 via antennas 242*a*, . . . , 242*n*. In the communication illustrated in FIG. 2, AP 202, which generates the beamforming signals, may be referred to as a beamformer and the STA 232, which receives the beamforming signals, may be referred to as a beamformee.

The matrix, Q, shown in FIG. 2, represents the plurality of beamforming matrices, $Q_k$, computed for the plurality of $N_{ST}$ subcarrier tones, where each matrix $Q_k$ comprises $N_{TX}$ rows and $N_{STS}$ columns. An individual coefficient in a $Q_k$ matrix may be referred to by the notation $[Q_k]_{i_{TX},i_{STS}}$ (where $i_{TX}$ represents a transmit chain signal index and $i_{STS}$ represents a space-time signal index). Beamforming matrix coefficient $[Q_k]_{i_{TX},i_{STS}}$ may be utilized by the spatial mapping block 212 to generate a portion of transmit chain signal $[s_k]_{i_{STS}}$ based on space-time stream signal $[s_k]_{i_{STS}}$.

The matrix Q may be computed at the beamformee based on received signals from the beamformer. The beamformee may then communicate the computed matrix Q to the beamformer via feedback information. In various embodiments of the invention, the matrix Q, which is utilized by the spatial mapping block 212, is generated based on the feedback information. Various methods may be utilized at the beamformee for computing the matrix Q, for example, singular value decomposition or maximum likelihood (ML) subspace beamforming. A method and system for ML subspace beamforming is disclosed in U.S. patent application Ser. No. 12/246,206, filed on Oct. 6, 2008, which is incorporated herein by reference in its entirety.

Figure 4:
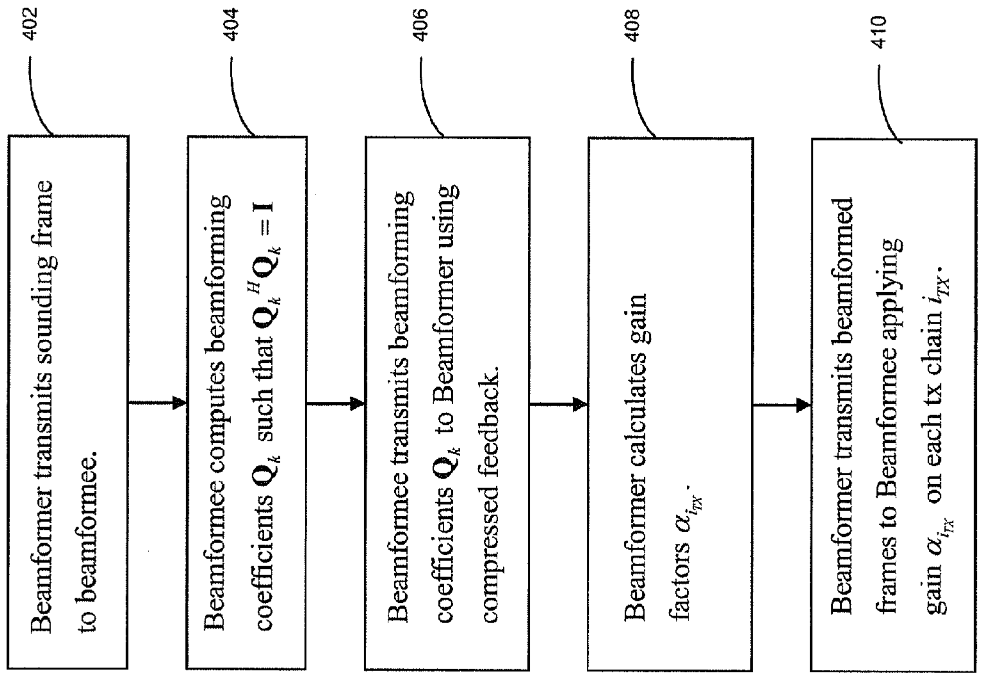
FIG. 4 is a flowchart that illustrates exemplary steps for beamforming signal transmission based on feedback information, in accordance with an embodiment of the invention.

FIG. 4 is a flowchart that illustrates exemplary steps for beamforming signal transmission based on feedback information, in accordance with an embodiment of the invention. Referring to FIG. 4, in step 402, a beamformer, for example AP 202, may transmit one or more sounding frames to a beamformee, for example STA 232. The beamformer may utilize sounding frames such as those described in, for example, the IEEE 802.11n specification. In step 404, the beamformee may compute beamforming coefficients $[Q_k]_{i_{TX},i_{STS}}$ in a beamforming matrix $Q_k$ based on the received sounding frames. The beamforming matrix may comprise a plurality of beamforming coefficients $[Q_k]_{i_{TX},i_{STS}}$. In various embodiments of the invention, the beamforming matrix may be computed such that $Q_k^H Q_k = I$ (where $Q_k^H$ is a Hermitian transpose version of $Q_k$ and I represents an identity matrix). In step 406, the beamformee may transmit the computed beamforming matrix to the beamformer via feedback information. In an exemplary embodiment of the invention, the beamformee may transmit the computed beamforming matrix via compressed feedback information as, for example, described in the IEEE 802.11n specification. In step 408, the beamformer may compute a plurality of antenna gain factors, $\alpha_{i_{TX}}$, based on the received feedback information. In step 410, the beamformer may utilize the computed antenna gain factors $\alpha_{i_{TX}}$ to amplify or attenuate the beamformed transmit chain signals $x_{i_{TX}}$ generated by spatial mapping block 212.

Figure 3:
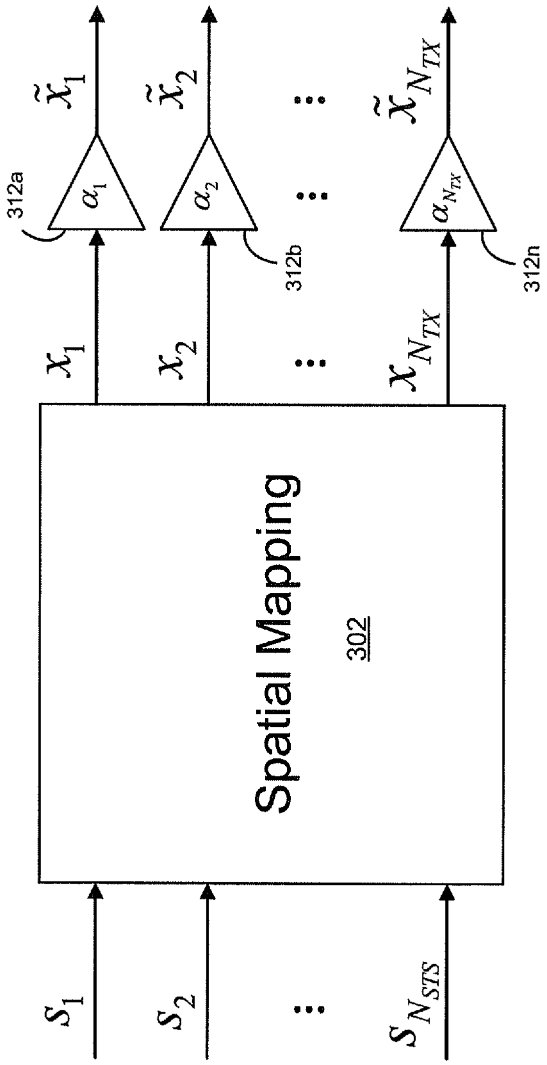
FIG. 3 is a block diagram that illustrates exemplary beamforming signal transmission under a per-antenna power constraint, in accordance with an embodiment of the invention.

FIG. 3 is a block diagram that illustrates exemplary beamforming signal transmission under a per-antenna power constraint, in accordance with an embodiment of the invention. Referring to FIG. 3, there is shown a spatial mapping block 302 and a plurality of per-antenna amplifiers, 312*a*, 312*b*, . . . , 312*n*. The spatial mapping block and per-antenna amplifiers may comprise logic, circuitry and/or code within a beamformer. The spatial mapping block 302 and/or per-antenna amplifiers 312*a*, 312*b*, . . . , 312*n*, may comprise suitable logic, circuitry and/or code that are operable to perform one or more of the functions disclosed herein.

As illustrated in FIG. 3, the spatial mapping block 302 receives a plurality of $N_{STS}$ space-time stream signals, $s_1$, $s_2$, . . . , $s_{N_{STS}}$, and generates a plurality of $N_{TX}$ transmit chain signals $x_1$, $x_2$, . . . , $x_{N_{TX}}$. The spatial mapping block may generate the transmit chain signals based on a beamforming matrix Q. The plurality of $N_{TX}$ transmit chain signals $x_1$, $x_2$, . . . , $x_{N_{TX}}$ are amplified by a corresponding plurality of $N_{TX}$ per-antenna amplifiers 312*a*, 312*b*, . . . , 312*n*, to generate a plurality of $N_{TX}$ amplified signals $\tilde{x}_1$, $\tilde{x}_2$, . . . , $\tilde{x}_{N_{TX}}$. The amplified signals $\tilde{x}_1$, $\tilde{x}_2$, . . . , $\tilde{x}_{N_{TX}}$ may be transmitted by the AP 202 via antennas 222*a*, 222*b*, . . . , 222*n*. As illustrated in FIG. 3, the amplifier 312*a* receives transmit chain signal $x_1$ and generates amplified signal $\tilde{x}_1$ based on the antenna power gain factor $\alpha_1$, the amplifier 312*b* receives transmit chain signal $x_2$ and generates amplified signal $\tilde{x}_2$ based on the antenna power gain factor $\alpha_2$ and the amplifier 312*n* receives transmit chain signal $x_{N_{TX}}$ and generates amplified signal $\tilde{x}_{N_{TX}}$ based on the antenna power gain factor $\alpha_{N_{TX}}$. Referring to FIG. 3, for a given subcarrier tone, k, in the $i_{TX}^{th}$ transmit chain, the amplified signal $\tilde{x}_{i_{TX}}$ may be represented as shown in the following equation:

$$[\tilde{x}_k]_{i_{TX}} = \alpha_{i_{TX}} \sum_{i_{STS}=1}^{N_{STS}} \left([Q_k]_{i_{tx},i_{STS}} [s_k]_{i_{STS}}\right) \quad [1]$$

where the transmit chain signal $x_{i_{TX}}$ may be represented as shown in the following equation:

$$[x_k]_{i_{TX}} = \sum_{i_{STS}=1}^{N_{STS}} \left([Q_k]_{i_{TX},i_{STS}} [s_k]_{i_{STS}}\right) \quad [2]$$

where: $[Q_k]_{i_{TX},i_{STS}}=0$ for unused subcarrier tones.

Without loss of generality, in an exemplary embodiment of the invention, the expected power level for space-time signals $[s_k]_1$, $[s_k]_2$, . . . , $[s_k]_{N_{STS}}$ may be assumed to be equal to unity (for example, $E\{|[S_k]_{i_{STS}}|^2\}=1$) for each subcarrier tone, k. Based on equations [1] and [2], the signal power level, $[P_k]_{i_{TX}}$, or amplified signal $[\tilde{x}_k]_{i_{TX}}$, may be represented as shown in the following equation:

$$[P_k]_{i_{TX}} = E\{|[\tilde{x}_k]_{i_{STS}}|^2\} = \alpha_{i_{TX}}^2 E\{|[x_k]_{i_{STS}}|^2\} \quad [3]$$

where $E\{X\}$ represents the expected value for X and $|X|^2$ represents the magnitude-squared value for X.

The per-antenna power constraint for the beamformer may be represented as shown in the following equation:

$$P_{max}^{i_{TX}} \geq \sum_{k=-N_{SR}}^{N_{SR}} [P_k]_{i_{TX}} \quad [4]$$

where the per-antenna radiated power from transmitting antenna $i_{TX}$, $P_{i_{TX}}$, is represented as shown in the following equation:

$$P_{i_{TX}} = \sum_{k=-N_{SR}}^{N_{SR}} [P_k]_{i_{TX}} \quad [5]$$

The total-power constraint for the beamformer may be represented as shown in the following equation:

$$P_{total} \geq \sum_{i_{TX}=1}^{N_{TX}} P_{i_{TX}} \quad [6]$$

Based on the foregoing, for each transmit chain a transmit chain power level, $T_{i_{TX}}$, may be computed as shown in the following equation:

$$T_{i_{TX}} = \frac{\sum_{i_{STS}=1}^{N_{STS}} \sum_{k=-N_{SR}}^{N_{SR}} |[Q_k]_{i_{TX},i_{STS}}|^2}{N_{ST}} \quad [7]$$

where $N_{ST}$ represents the number of subcarrier tones, k, within a channel bandwidth and $N_{NR}$ represents the highest subcarrier index value for k. The range of index values ($-N_{NR}$, $-N_{NR}+1, \ldots, -1, 1, \ldots, N_{NR}-1, N_{NR}$) comprises a plurality of $N_{ST}$ index values.

The transmit chain power level, $T_{i_{TX}}$, as shown in equation [7] represents a normalized power level computed across the subcarrier tones within the channel bandwidth for the $i_{TX}^{th}$ transmit chain. The transmit chain power level is computed based on the beamforming coefficients, $[Q_k]_{i_{TX}, i_{STS}}$, for each space-time stream signal, $s_{i_{TX}}$, which is utilized to generate transmit chain signal $x_{i_{TX}}$.

In various embodiments of the invention, the antenna power gain factor $\alpha_{i_{TX}}$ may be computed for each transmit chain signal $x_{i_{TX}}$ based on the per-antenna power constraint parameter, $P_{max}^{i_{TX}}$, and the computed transmit chain power level, $T_{i_{TX}}$ as shown in the following equation:

$$\alpha_{i_{TX}} = \sqrt{\frac{P_{max}^{i_{TX}}}{T_{i_{TX}}}} \quad [8]$$

In various embodiments of the invention, the antenna gain factors $\alpha_{i_{TX}}$ may be computed as shown in equation [8] when the beamformer transmits signals under a per-antenna power constraint (equation [4]) or when the per-antenna constraint parameter, $P_{max}^{i_{TX}}$, is specified to ensure that the total-power constraint is met (for example, when $$\left. P_{total} \geq \sum_{i_{TX}=1}^{N_{TX}} P_{max}^{i_{TX}} \right).$$

Figure 5:
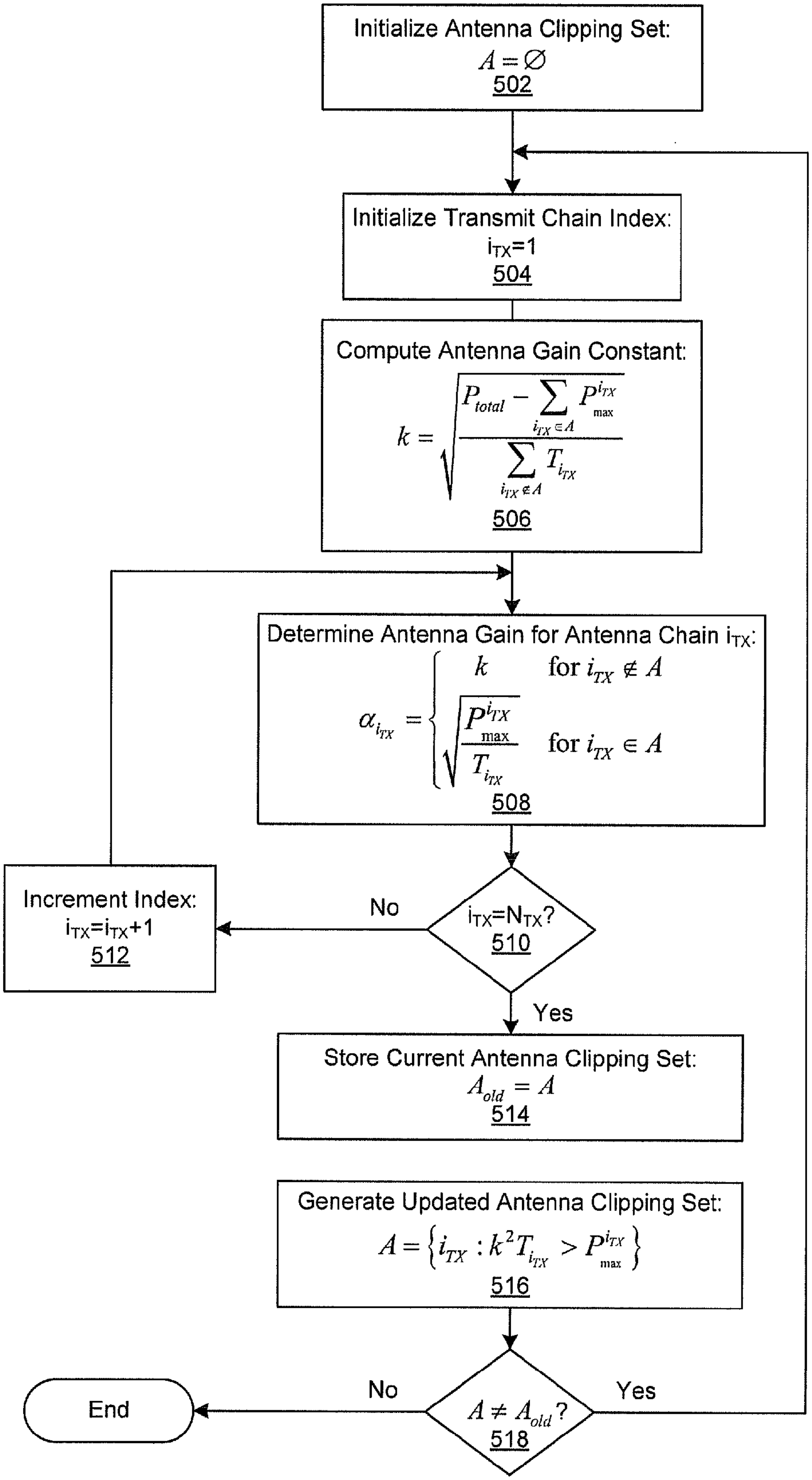
FIG. 5 is a flowchart that illustrates exemplary steps for beamforming signal transmission, in accordance with an embodiment of the invention.

FIG. 5 is a flowchart that illustrates exemplary steps for beamforming signal transmission, in accordance with an embodiment of the invention. When the beamformer transmits signals under a per-antenna power constraint (equation [4]) and under a total-power constraint (equation [6]), in step 502, an antenna clipping set, A, is initialized to comprise an empty set. The antenna clipping set A refers to the set of amplified signals $\tilde{x}_{i_{TX}}$ for which the signal power level exceeds the per-antenna power constraint. In step 504, a transmit chain index, $i_{TX}$ is initialized. In an exemplary embodiment of the invention the initial value $i_{TX}=1$. In step 506, an antenna gain constant value, k, is computed as shown in the following equation:

$$k = \sqrt{\frac{P_{total} - \sum_{i_{TX} \in A} P_{max}^{i_{TX}}}{\sum_{i_{TX} \notin A} T_{i_{TX}}}} \quad [9]$$

where an aggregate power level for the antenna clipping set A:

$$\sum_{i_{TX} \in A} P_{max}^{i_{TX}} \quad [10a]$$

is computed by summing individual maximum per-antenna power levels for transmit chains $i_{TX}$, which belong to set A. An aggregate transmit chain power level:

$$\sum_{i_{TX} \notin A} T_{i_{TX}} \quad [10b]$$

is computed that is by summing individual transmit chain power levels, $T_{i_{TX}}$ (computed as shown in equation [7]), for the transmit chains, $i_{TX}$ (where $i_{TX}$ is a transmit chain index), which are not within the set A. In an exemplary embodiment of the invention, there is a plurality of ($N_{TX}-|A|$) transmit chains, which are not within set A, where |A| represents the number of elements in set A.

Steps 508, 510 and 512 comprise an inner loop in which per-antenna gain factors are iteratively computed for the plurality of $N_{TX}$ transmit chain signals. The value for the transit chain index, $i_{TX}$ is incremented with each pass through the inner loop. In step 508, a per-antenna gain factor, $\alpha_{i_{TX}}$, is computed for the $i_{TX}^{th}$ transmit chain (where the value $i_{TX}$ is based on the current value of the transmit chain index). In instances where the transmit chain $i_{TX}$ is not within set A, $\alpha_{i_{TX}}=k$ (where k is computed as shown in equation [9]). In instances where the transmit chain $i_{TX}$ is within set A, the per-antenna gain factor, $\alpha_{i_{TX}}$, is computed under a per-antenna power constraint as shown in equation [8]. Step 510 may determine whether there are remaining transmit chains for which a per-antenna gain factor is to be computed. In instances, at step 510, where there are remaining transmit chains, in step 512, the transmit chain index value is incremented. Step 508 follows step 512 and a per-antenna gain factor is computed for the next transmit chain. In instances, at step 510, where there are no remaining transmit chains, in step 514, the current antenna clipping set, A, is stored as a set $A_{old}$. In step 516, an updated antenna clipping set is generated. The set of transmit chains, $i_{TX}$, within the updated set A comprise the set of transmit chains for which the amplified transmit chain power level, $k^2T_{i_{TX}}$ (where $T_{i_{TX}}$ is as computed as shown in equation [7] and k is as computed in equation [9]), exceeds the maximum per-antenna power level parameter, $P_{max}^{i_{TX}}$. That is, the updated set A comprises transmit chains, $i_{TX}$, for which the amplified transmit chain power level, $k^2T_{i_{TX}}$, exceeds the per-antenna power constraint. Step 518 may determine whether transmit chains have been added in the updated set A, relative to set $A_{old}$. In instances, at step 518, where no addition of transmit chains is detected in the updated set A, the computation of per-antenna gain factors may end. In various embodiments of the invention, the computation of per-antenna gain factors may restart (for example, restarting from step 502) at a subsequent time instant, for example after a beamformer transmits one or more subsequent sounding frames to a beamformee.

In instances, at step 518, where $A \neq A_{old}$, transmit chains have been added in the updated set A. Referring to FIG. 5, an outer loop is performed when addition of transmit chains from the set A is detected in step 518. The outer loop is performed when step 504 follows step 518. At the beginning of each outer loop iteration, the transmit chain index is initialized in step 504, a new antenna gain constant value is computed in step 506 as shown in equation [9], and the inner loop is again performed.

Various embodiments of the invention comprise a method and system for beamforming signal transmission under a power constraint. When the power constraint is a per-antenna power constraint, a beamformer may compute a plurality of $N_{TX}$ per-antenna gain factors, $\alpha_{i_{TX}}$, each of which is computed as shown in equation [8]. The plurality of per-antenna gain factors may be utilized by a beamformer as shown in FIG. 3.

When the power constraint is a joint per-antenna constraint and a total-power constraint, a beamformer may compute a plurality of $N_{TX}$ per-antenna gain factors, $\alpha_{i_{TX}}$. For transmit chains, $i_{TX}$, which exceed the per-antenna power constraint, the per-antenna gain factor is computed as shown in equation [8]. For transmit chains, $i_{TX}$, which do not exceed the per-antenna power constraint, the per-antenna gain factor is computed as shown in equation [9].

One aspect of the antenna gain constant value, k, as computed in equation [9] is that an allocated aggregate power level is computed for the antennas that operate under the per-antenna power constraint. This aggregate power level is represented in equation [10a]. In addition, a power headroom level, which may be referred to as the residual power, is computed. The power headroom level represents the amount of available total power that has not been allocated among antennas under the per-antenna power constraint. The power headroom level is represented in equation [9] as $$\left(P_{total} - \sum_{i_{TX} \in A} P_{max}^{i_{TX}}\right).$$

In effect, the antenna gain constant value, k, represents an allocation of the power headroom level among the remaining antennas.

Referring to FIG. 5, when the beamformer operates under a joint per-antenna constraint and a total-power constraint, antennas within set A operate under a per-antenna constraint. After allocation of power among the antennas within set A, a power headroom level is determined based on the total-power constraint. The power headroom level is allocated among the antennas that are not within set A. Accordingly, antennas that are not within set A operate under a total-power constraint.

Various embodiments of the invention comprise a method and system for fine tuning the coefficients within beamforming matrix, $Q_k$, based on the computed per-antenna gain factors.

Figure 6:
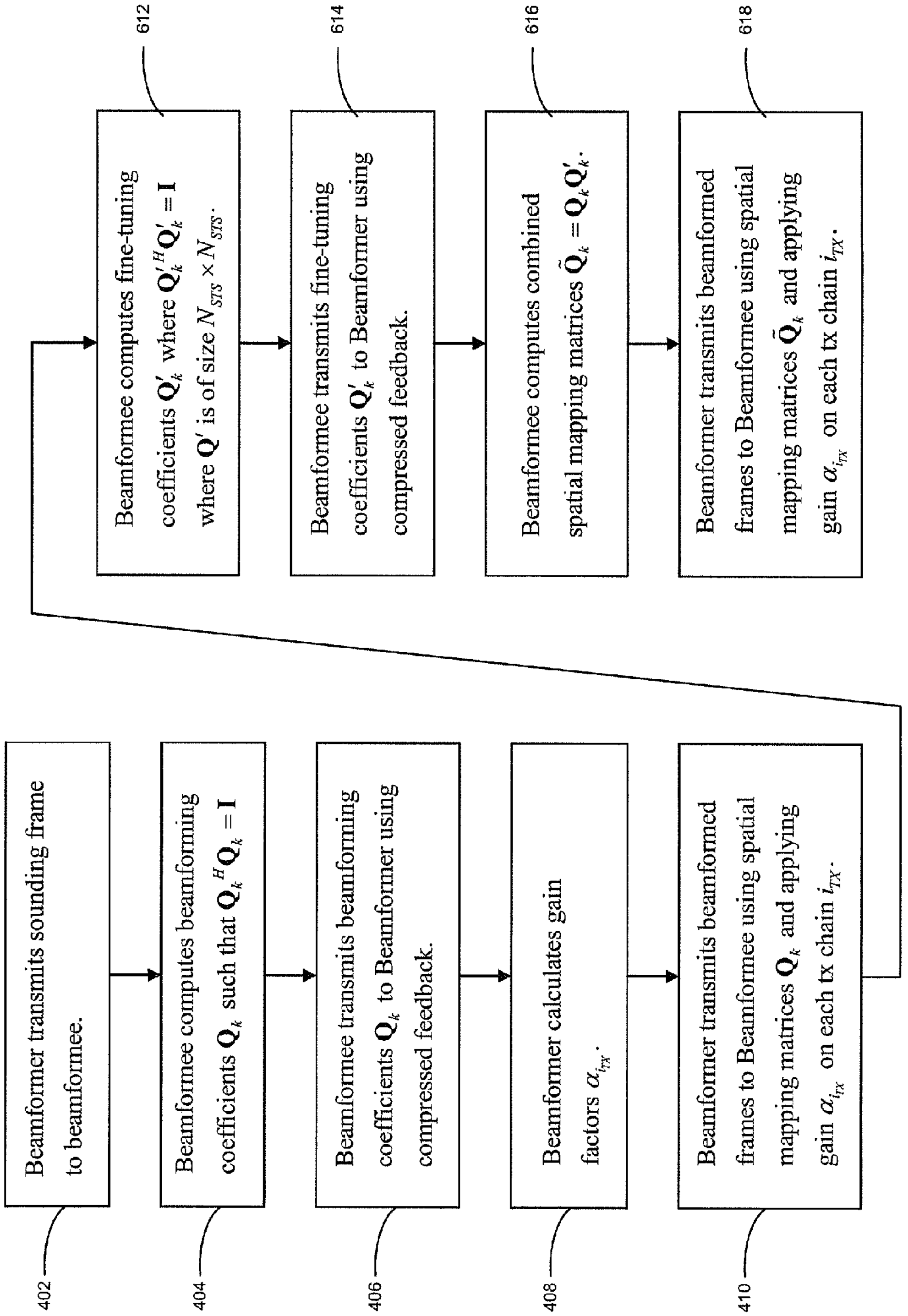
FIG. 6 is a flowchart that illustrates exemplary steps for adjusted beamforming signal transmission based on computed per-antenna gain factors, in accordance with an embodiment of the invention.

FIG. 6 is a flowchart that illustrates exemplary steps for adjusted beamforming signal transmission based on computed per-antenna gain factors, in accordance with an embodiment of the invention. Referring to FIG. 6, steps 402, 404, 406, 408 and 410 are as described in FIG. 4. Referring to FIG. 6, following step 410, the beamformee receives beamforming signals from the beamformer. The beamforming signals were generated by the beamformer based on the computed per-antenna gain factors, $\alpha_{i_{TX}}$. In step 612, the beamformee may compute fine tuning matrix, $Q_k'$, based on the received signals. In various embodiments of the invention, the fine tuning matrix may be computed such that $Q_k'^H Q_k' = I$. In an exemplary embodiment of the invention, the fine tuning matrix $Q_k'$ comprises a plurality of $N_{STS}$ rows and a plurality of $N_{STS}$ columns. In step 614, the beamformee may transmit the fine tuning matrix $Q_k'$ to the beamformer via feedback information. In step 616, the beamformer may compute a combined beamforming matrix $\tilde{Q}_k = Q_k Q_k'$. In various embodiments of the invention, the fine tuning matrix $Q_k'$ may be utilized by the beamformer as a precoding matrix. In step 618, the spatial mapping block 212, and/or spatial mapping block 302, may generate subsequent beamforming signals based on the computed per-antenna gain factors, $\alpha_{i_{TX}}$, and the combined beamforming matrix $\tilde{Q}_k$.

Referring to FIG. 3, in various embodiments of the invention, the relationship among the signals may be represented as shown in the following equations:

$$\tilde{X} = \Gamma \cdot Q_k Q_k' S \quad [11]$$

$$\tilde{X} = \Gamma \cdot X \quad [12]$$

where:

$$S = \begin{bmatrix} s_1 \\ s_2 \\ \vdots \\ s_{N_{STS}} \end{bmatrix} \quad [13]$$

$$\Gamma = \begin{bmatrix} \alpha_1 \\ \alpha_2 \\ \vdots \\ \alpha_{N_{TX}} \end{bmatrix} \quad [14]$$

$$\tilde{X} = \begin{bmatrix} \tilde{x}_1 \\ \tilde{x}_2 \\ \vdots \\ \tilde{x}_{N_{TX}} \end{bmatrix} \quad [15]$$

$$X = \begin{bmatrix} x_1 \\ x_2 \\ \vdots \\ x_{N_{TX}} \end{bmatrix} \quad [16]$$

and $\Gamma \circ X$ represents the Hadamard product of vectors $\Gamma$ and X (such that $[\Gamma \circ X]_i = \Gamma_i X_i$). $Q_k$ represents a beamforming matrix and $Q_k'$ represents a precoding matrix (where $\tilde{Q}_k = Q_k Q_k'$ represents a combined beamforming matrix). In various embodiments of the invention, and referring to equations [11]-[16], vectors $\Gamma$, S, X and/or $\tilde{X}$, and/or matrices $Q_k$ and/or $Q_k'$ may comprise real values and/or complex values.

In various embodiments of the invention, a processor 112, utilized in connection with a transmitting station (for example, AP 202), may enable beamforming signal transmission under a per-antenna constraint. The processor 112 may enable determination of a transmit chain power level for each of a plurality of transmitting antennas (for example, transmitting antennas 222*a*, 222*b*, . . . , 222*n*) at the transmitting station. The transmitting station may be referred to as a beamformer. At the beamformer, a number of clipping antennas (for example, transmit antennas that belong to set A, as referred to in FIG. 5), which are selected from the plurality of transmitting antennas, may be determined. For each of the selected transmitting antennas, an amplified power level may be greater than a maximum per-antenna threshold level, $P_{max}^{i_{TX}}$, as shown in step 516 (referring to FIG. 5). A per-antenna gain factor, $\alpha_{i_{TX}}$, for each of the clipping antennas may be determined based on the maximum per-antenna threshold level as shown in equation [8]. A power headroom level, $$\left(P_{total} - \sum_{i_{TX} \in A} P_{max}^{i_{TX}}\right),$$

may be determined based on a maximum total-power threshold level, $P_{total}$, the maximum per-antenna threshold level and on the number of clipping antennas as shown in equation [9].

A non-clipping per-antenna per-antenna gain factor, $\alpha_{i_{TX}}$, may be determined for the plurality of transmitting antennas, after exclusion of the clipping antennas, based on the power headroom level.

The transmit chain power level, $T_{TX}$ for each of the transmitting antennas, may be computed based on a summation of a plurality of beamforming coefficients, $[Q_k]_{i_{TX},i_{STS}}$, as shown in equation [7]. The plurality of beamforming coefficients, $[Q_k]_{i_{TX},i_{STS}}$, may be generated at the beamformer based on feedback information from a beamformee, for example, the STA 232. The plurality of beamforming coefficients, $[Q_k]_{i_{TX},i_{STS}}$, may correspond to the $i_{TX}^{th}$ transmitting antenna. The clipping antenna gain factor, $\alpha_{i_{TX}}$, may be computed based on a ratio of the maximum per-antenna threshold level and the transmit chain power level, $T_{i_{TX}}$ for each of the clipping antennas as shown in equation [8]. A transmit signal power level, $\tilde{X}$, may be computed for each of the clipping antennas based on a multiplicative product of the corresponding transmit chain power level, $T_{i_{TX}}$, and the corresponding clipping per-antenna gain factor, $\alpha_{i_{TX}}$, as shown in equation [12] and in FIG. 3.

A set of non-clipping antennas may comprise the plurality of transmitting antennas after exclusion of the clipping antennas. The non-clipping per-antenna gain factor, k, may be computed for each of the non-clipping antennas based on a ratio of the power headroom level and an aggregate transmit chain power level, as shown in equation [9]. The aggregate transmit chain power level may be computed based on a summation of individual transmit chain power levels, $T_{i_{TX}}$, wherein each individual transmit chain power level corresponds to a non-clipping antenna in the set of non-clipping antennas. A transmit signal power level, $\tilde{X}$, may be computed for each of the non-clipping antennas based on a multiplicative product of the corresponding transmit chain power level, $T_{i_{TX}}$, and the non-clipping per-antenna gain factor, k, as shown in equation [12] and in FIG. 3.

The amplified transmit chain power level may be computed for each of the transmitting antennas based on the non-clipping per-antenna gain factor, k, and the transmit chain power level, $T_{i_{TX}}$.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for beamforming signal transmission under a per-antenna power constraint.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals, the method comprising:

in a transmitting station comprising a plurality of transmitting antennas:

generating a plurality of transmit chain signals corresponding to said plurality of transmitting antennas based on a plurality of data stream signals;

determining a per-antenna gain factor for each of said plurality of transmitting antennas based on one or more maximum per-antenna threshold levels and/or a maximum total-power threshold level;

generating a plurality of transmitted signals based on said determined per-antenna gain factors and said plurality of transmit chain signals;

determining a transmit chain power level for each of said plurality of transmit chain signals;

selecting clipping antennas from said plurality of transmitting antennas, wherein for each of said clipping antennas, an amplified said transmit chain power level is greater than the corresponding maximum per-antenna threshold level; and determining a clipping per-antenna gain factor for each clipping antenna based on the corresponding maximum per-antenna threshold level and based on a ratio of the corresponding maximum per-antenna threshold level and a corresponding said transmit chain power level.

2. The method according to claim 1, comprising computing said transmit chain power level for each of said plurality of transmit chain signals based on a summation, wherein said summation is based on a corresponding plurality of beamforming coefficients.

3. The method according to claim 1, comprising computing said corresponding plurality of beamforming coefficients based on feedback information.

4. The method according to claim 1, comprising generating at least a portion of said plurality of transmitted signals based on said plurality of transmit chain signals corresponding to said clipping antennas and said clipping per-antenna gain factors for said clipping antennas.

5. The method according to claim 1, comprising determining a residual power level to be allocated among non-clipping antennas comprising remaining ones of said plurality of transmitting antennas based on said maximum total-power threshold level, said one or more maximum per-antenna threshold levels and said clipping antennas.

6. The method according to claim 5, comprising computing said residual power level by computing a summation value based on said one or more maximum per-antenna threshold level corresponding to said clipping antennas and subtracting said computed summation value from said maximum total-power threshold level.

7. The method according to claim 5, comprising determining a non-clipping antenna gain factor for said non-clipping antennas based on said residual power level.

8. The method according to claim 7, comprising computing said non-clipping per-antenna gain factor for each of said non-clipping antennas based on a ratio of said residual power level and an aggregate transmit chain power level.

9. The method according to claim 8, comprising computing said aggregate transmit chain power level based on a summation of said transmit chain power levels corresponding to said non-clipping antennas.

10. The method according to claim 7, comprising generating at least a portion of said plurality of transmitted signals based on said non-clipping per-antenna gain factor and said plurality of transmit chain signals corresponding to said non-clipping antennas.

11. The method according to claim 1, comprising generating said plurality of transmit chain signals based on a plurality of beamforming coefficients.

12. The method according to claim 11, comprising receiving feedback information subsequent to said generating said plurality of transmitted signals.

13. The method according to claim 12, comprising generating a plurality of modification beamforming coefficients based on said received feedback information.

14. The method according to claim 13, comprising generating a subsequent plurality of transmit chain signals based on said plurality of beamforming coefficients and/or said plurality of modification beamforming coefficients.

15. The method according to claim 14, comprising generating a subsequent plurality of transmitted signals based on said determined per-antenna gain factors and said subsequent plurality of transmit chain signals.

16. The method according to claim 13, wherein said plurality of modification beamforming coefficients is represented as a precoding matrix.

17. A system for processing signals, the system comprising:

one or more circuits for use in a transmitting station comprising a plurality of transmitting antennas, said one or more circuits enable:

generating a plurality of transmit chain signals corresponding to said plurality of transmitting antennas based on a plurality of data stream signals;

determining a per-antenna gain factor for each of said plurality of transmitting antennas based on one or more maximum per-antenna threshold levels and/or a maximum total-power threshold level;

generating a plurality of transmitted signals based on said determined per-antenna gain factors and said plurality of transmit chain signals;

determining a transmit chain power level for each of said plurality of transmit chain signals;

selecting clipping antennas from said plurality of transmitting antennas, wherein for each of said clipping antennas, an amplified said transmit chain power level is greater than the corresponding maximum per-antenna threshold level; and computing a clipping per-antenna gain factor for each of the selected clipping antennas based on a ratio of the corresponding maximum per-antenna threshold level and a corresponding said transmit chain power level.

18. The system according to claim 17, wherein said one or more circuits enable computation of said transmit chain power level for each of said plurality of transmit chain signals based on a summation, wherein said summation is based on a corresponding plurality of beamforming coefficients.

19. The system according to claim 18, wherein said one or more circuits enable computation of said corresponding plurality of beamforming coefficients based on feedback information.

20. The system according to claim 17, wherein said one or more circuits enable determination of a clipping per-antenna gain factor for each of said clipping antennas based on said corresponding maximum per-antenna threshold level.

21. The system according to claim 17, wherein said one or more circuits enable generation of at least a portion of said plurality of transmitted signals based on said plurality of transmit chain signals corresponding to said clipping antennas and said clipping per-antenna gain factors for said clipping antennas.

22. The system according to claim 17, wherein said one or more circuits enable determination of a residual power level to be allocated among non-clipping antennas comprising remaining ones of said plurality of transmitting antennas based on said maximum total-power threshold level, said one or more maximum per-antenna threshold levels and said clipping antennas.

23. The system according to claim 22, wherein said one or more circuits enable computation of said residual power level by computing a summation value based on said one or more maximum per-antenna threshold level corresponding to said clipping antennas and subtracting said computed summation value from said maximum total-power threshold level.

24. The system according to claim 22, wherein said one or more circuits enable determination of a non-clipping antenna gain factor for said non-clipping antennas based on said residual power level.

25. The system according to claim 24, wherein said one or more circuits enable computation of said non-clipping per-antenna gain factor for each of said non-clipping antennas based on a ratio of said residual power level and an aggregate transmit chain power level.

26. The system according to claim 25, wherein said one or more circuits enable computation of said aggregate transmit chain power level based on a summation of said transmit chain power levels corresponding to said non-clipping antennas.

27. The system according to claim 24, wherein said one or more circuits enable generation of at least a portion of said plurality of transmitted signals based on said non-clipping per-antenna gain factor and said plurality of transmit chain signals corresponding to said non-clipping antennas.

28. The system according to claim 17, wherein said one or more circuits enable generation of said plurality of transmit chain signals based on a plurality of beamforming coefficients.

29. The system according to claim 28, wherein said one or more circuits enable reception of feedback information subsequent to said generating said plurality of transmitted signals.

30. The system according to claim 29, wherein said one or more circuits enable generation of a plurality of modification beamforming coefficients based on said received feedback information.

31. The system according to claim 30, wherein said one or more circuits enable generation of a subsequent plurality of transmit chain signals based on said plurality of beamforming coefficients and/or said plurality of modification beamforming coefficients.

32. The system according to claim 31, wherein said one or more circuits enable generation of a subsequent plurality of transmitted signals based on said determined per-antenna gain factors and said subsequent plurality of transmit chain signals.

33. The system according to claim 30, wherein said plurality of modification beamforming coefficients is represented as a precoding matrix.

34. A method for processing signals, the method comprising:

in a transmitting station comprising a plurality of transmitting antennas:

generating a plurality of transmit signals;

determining per-antenna gain factors;

determining a transmit power level for each of said plurality of transmit signals;

selecting clipping antennas from said plurality of transmitting antennas, wherein for each of said clipping antennas, an amplified said transmit power level is greater than a corresponding maximum per-antenna threshold level; and determining a clipping antenna gain factor for each of the clipping antennas based on the corresponding maximum per-antenna threshold level and based on a ratio of the corresponding maximum per-antenna threshold level and a corresponding said transmit power level.

35. The method according to claim 34, comprising computing said transmit power level for each of said plurality of transmit signals based on a summation of beamforming coefficients.

36. The method according to claim 35, comprising computing said corresponding plurality of beamforming coefficients based on feedback information.

* * * * *